M. POSER.
OPHTHALMIC TEST LENS FRAME.
APPLICATION FILED JAN. 13, 1919.
1,337,265. Patented Apr. 20, 1920.
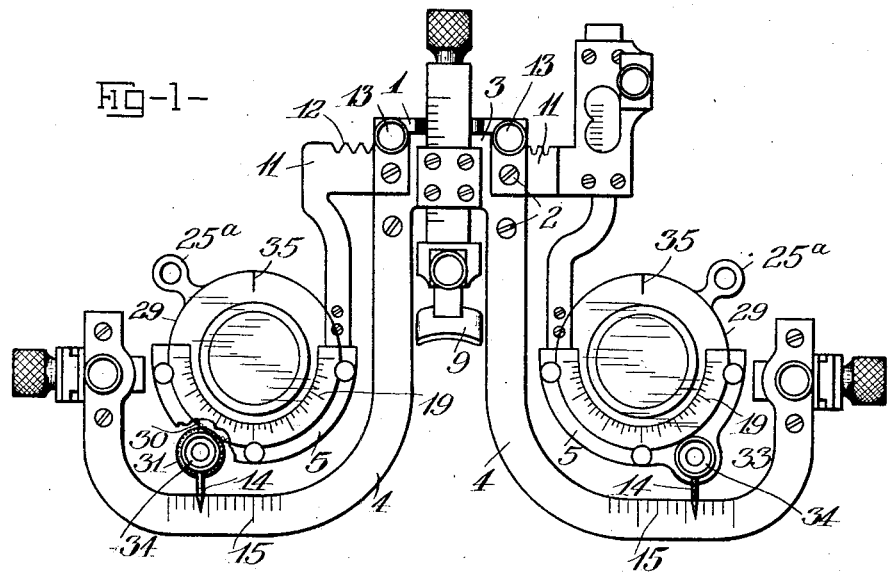
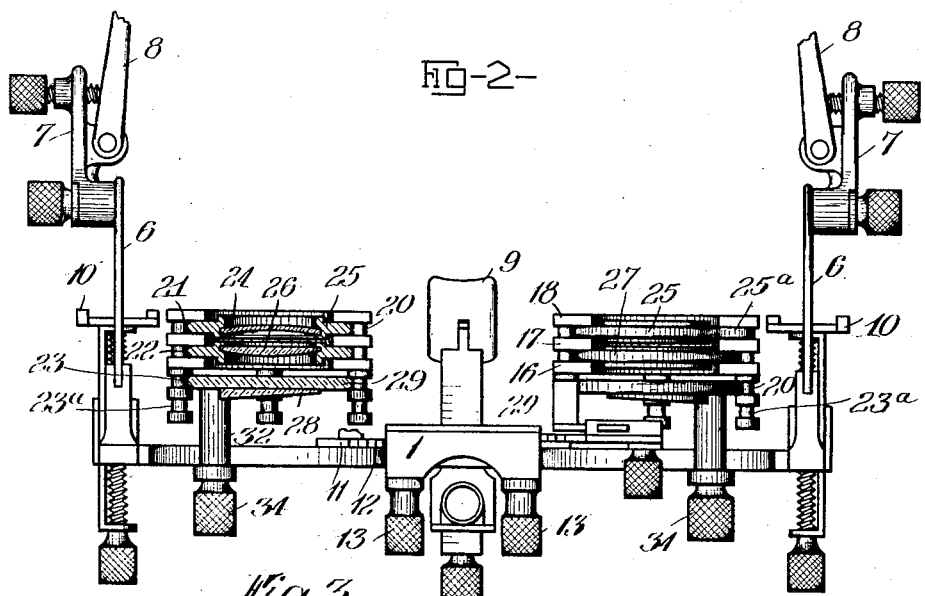
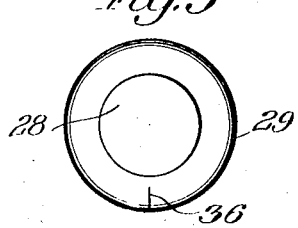
INVENTOR
Max Poser.
BY
his ATTORNEYS

UNITED STATES PATENT OFFICE.

MAX POSER, OF ROCHESTER, NEW YORK, ASSIGNOR TO BAUSCH & LOMB OPTICAL COMPANY, OF ROCHESTER, NEW YORK, A CORPORATION OF NEW YORK.

OPHTHALMIC-TEST-LENS FRAME.

1,337,265.  Specification of Letters Patent.  Patented Apr. 20, 1920.

Original application filed March 15, 1916, Serial No. 84,358. Divided and this application filed January 13, 1919. Serial No. 270,793.

*To all whom it may concern:*

Be it known that I, MAX POSER, a subject of the Grand Duke of Saxe-Weimar, residing at Rochester, in the county of Monroe, State of New York, have invented certain new and useful Improvements in Ophthalmic-Test-Lens Frames; and I do declare the following to be a full, clear, and exact description of the same, reference being had to the accompanying drawings, forming a part of this specification, and to the characters of reference marked thereon.

My invention relates to apparatus for optical purposes such as used in testing the refraction of a patient's eyes and obtaining the necessary data for fitting eyeglasses. More particularly my invention relates to test lens frames that are portable and are adapted to be supported in position before a patient's eyes by means of a nose piece resting on a patient's nose and a pair of temples by which the device is held in position. The present application is a division of my prior application Ser. No. 84,358, for ophthalmic test lens frames filed Mar. 15, 1916.

The object of my invention is to provide a test lens frame having improved trial lens carriers so constructed that each of the necessary trial lenses can be inserted, adjusted or removed without disturbing other lenses in the carriers. Another object of my invention is to provide a trial lens carrier having means for rotatively adjusting a trial lens, said carrier being provided with a scale with which an index on the trial lens mount is adapted to coöperate. A still further object of my invention is to provide a trial lens carrier having separate pockets for the different types of test lenses each of which has a mounting especially adapted to facilitate its use in a lens carrier of that particular form.

In the drawings:

Figure 1 is a front elevation of a test lens frame involving one form of my invention.

Fig. 2 is a plan view of the same, one of the lens carriers with the trial lenses therein being shown in section, and Fig. 3 is a plan view of a prism lens and its mount.

Similar reference numerals refer to the same parts in all the figures of the drawings.

The numeral 1 indicates a short central transverse head or bridge to which is fixed by screws 2, a short top arch plate portion 3, from opposite ends of which two pendent U-shaped frame portions 4 project downward and then range laterally outward, and thence upward so as to stand in a vertical plane in front of a semi-annular carrier 5 having open topped pockets for test lenses. To the outer end of the frame portion 4 is fixed an elastic intermediate plate 6, pivotally carrying at its rear end a coupling 7 to which one of the laterally adjustable temples 8 of the test lens frame is pivoted. Two opposite temples coact with a central nose piece 9 vertically adjustable on the frame bridge 1, for holding the test lens frame to the head of a patient whose eyes are to be refracted. An adjustable sighting cornea gage 10 is also mounted on the end of the frame portion 4. Each carrier 5 is fixed to a right angular plate support 11, the upper horizontal part of which slides in the frame bridge 1, and has a rack 12, which is engaged by a pinion upon the shaft of a milled finger stud 13, for laterally adjusting the axes of the two test lens carriers 5 relatively to the interpupilary distance of a patient's eyes. An index pointer 14 on the carrier 5, registers the lateral pupilary distance relatively to a scale 15 on the frame portion 4. The illustrated parts 6 to 13 are but incidenally mentioned as they form no part of the herein described invention.

Each lens carrier 5 of the test lens frame is made with three semi-annular portions 16, 17 and 18. The front plate 16, which is secured directly to the carrier support 11, bears on its outer face a radial scale 19, and the three plates 16, 17 and 18 are spaced apart by pins or studs 20, which hold said three plates substantially parallel to provide between the plates 18, 17, a rear lens pocket 21, and between the plates 17, 16, a lens pocket 22. These studs 20 project forwardly beyond the scale carrying plate 16, and are provided with one or more peripheral grooves forming outer lens pockets 23 and 23ª. The studs 20 form the bottoms of the carrier pockets 21, 22, 23 and 23ª and retain the test lenses therein. The rear carrier pocket 21 is adapted to support a spherical test lens 24 set in any suitable mounting 25, the intermediate pocket 22 is adapted to receive a cylindrical test lens 26 set in a special mounting 27, and the pockets 23 and 23ª are adapted to receive a prism test lens 28 held by a special transparent mounting 29.

The mounting 27 of the cylindrical test lens 26 is peripherally knurled at 30 where it is engaged by a pinion 31 located in the carrier pocket 22 and fixed to a shaft 32, which is journaled in a boss bearing 33 fixed to the front carrier plate 16. The pocket 22 being open at the top, the lens mounting 27 may be merely dropped therein, causing its knurled edge to rest upon and engage with the correspondingly formed surface of the pinion 31 and no further securing device is required. The shaft 32 may be manually rotated by turning its milled head 34, to turn the pinion 31, and thus conveniently rotate the mounting 27 and its contained cylindrical trial lens 26 from in front of the test lens frame. The above named index 14 is fixed to the boss bearing 33 on the carrier.

The mountings 25, 27 for the respective spherical lenses, either plus or minus, and cylindrical lenses 24, 26, may be made of rubber, metal or other material which may be opaque, and the spherical test lens mountings 25 preferably have a laterally projecting handle portion 25ª shown in Fig. 1 of the drawings. The cylindrical test lens mountings 27 have one or more radial marks 35 which indicate the optical axis of the lenses. The mountings 29 of the prisms 28 are made of glass or celluloid or other transparent material allowing easy reading through it of the radial scale 19 behind it, and also of the axis indicating marks 35 on the mounting 27 of a cylindrical test lens 26 placed in the carrier pocket 22 behind the prism mounting 29, which has a radial mark 36 indicating the true base of the test prism 28.

In use the test lens frame will first be steadily supported on the patient's head by the temples 8 and the nose piece 9, and a test lens, say a cylindrical lens 26 in its mounting 27, will be placed in the pocket 22 of each of the two carriers 5. Lateral adjustment of the carriers is secured by turning the milled heads 13, to obtain correct pupilary adjustments of the test lenses.

When in their respective pockets in the frame the index marks on the cylinder lens mounts and the prism lens mounts are adapted to coöperate with the radial scale 19, and when the prism lens is used both the scale and the indices on the cylinder lens mount are visible through the transparent prism lens mount. When correcting for phorias, it is necessary to introduce a prism lens, and astigmatism is then corrected by the use of both cylinder and spherical lenses which are then adjusted in their proper pockets. It is therefore important that these test lenses be independently supported and adjustable.

The fourth pocket is adapted to receive a lens for compensating for either over or under correction or for an additional lens sometimes necessary in hyperopia cases.

The advantages of the present invention are obvious. If the patient who is to be refracted requires a spherical lens, it is placed in the pocket nearest the eye. The cylinder lens, if required, is placed in the next pocket and if phoria is to be corrected for, a prism lens can be inserted in the pocket next adjacent the cylinder lens without disturbing the lens combination for distance vision. Any desired power lens for reading, especially in presbyopy cases may be inserted in the outer pocket.

I claim as my invention:

1. An ophthalmic test lens frame comprising a carrier, a plurality of test lens receiving pockets on the carrier and an indicator scale adjacent said receiving pockets, one of said pockets being adapted to receive a cylindrical test lens having a mounting provided with an index to indicate the optical axis of the lens and coöperate with said scale, and another of said pockets adapted to receive a test prism having a substantially transparent mounting provided with an index for the prism base and also adapted to coöperate with said scale, the transparency of the prism mounting permitting the underlying scale to be read therethrough.

2. An ophthalmic test lens frame comprising a carrier having a plurality of test lens receiving pockets and an adjacent scale, two mountings adapted to respective carrier pockets, one mounting being transparent and carrying a test prism and having a mark indicating the prism base, and the other mounting carrying a cylindrical test lens and a mark indicating its optical axis, said prism and lens mountings being relatively supported in the carrier to have the marks of both mountings readable at and through the transparent prism mounting relatively to the carrier scale.

3. An ophthalmic test lens frame comprising a carrier having a plurality of test lens receiving pockets and an adjacent front scale, a transparent mounting carrying a test prism and a mark indicating the prism base, and adapted to be placed in the outer carrier pocket in front of the carrier scale, and a mounting carrying a cylindrical test lens and having a mark indicating the optical axis of said lens and adapted to be placed in a carrier pocket behind the transparent prism mounting at and through which the index marks of both applied mountings are readable relatively to the carrier scale.

4. An ophthalmic test lens frame comprising a carrier having a plurality of test lens receiving pockets and an adjacent scale, a transparent mounting carrying a test prism and a mark indicating the prism base adapted to be placed in the outer carrier pocket in front of the carrier scale, and a mounting carrying a cylindrical test lens and having a mark indicating the optical axis of said lens and adapted to be placed in a carrier pocket behind the transparent prism mounting at and through which the index marks of both applied mountings are readable relatively to the carrier scale, the axis mark of the cylindrical lens mounting being visible through the transparent prism mounting.

5. An ophthalmic test lens frame comprising a carrier having a plurality of test lens receiving pockets, and an adjacent scale on its front wall, a mounting carrying a spherical test lens and adapted to be placed in an inner carrier pocket, a mounting carrying a cylindrical test lens and having a mark indicating the optical axis of said lens and adapted to be placed in an intermediate carrier pocket in front of the spherical test lens, and a transparent mounting carrying a test prism and marked to indicate the prism base and adapted to be placed in a carrier pocket in front of the cylindrical test lens.

6. An ophthalmic test lens frame comprising a carrier having a plurality of test lens pockets arranged one behind the other, and an indicating scale arranged adjacent one of said pockets, said pockets being adapted to receive respective lens mountings having test lenses and provided with indicating marks adapted to coöperate with said scale and one of said mountings being substantially transparent to permit the reading of the underlying scale.

7. In an optical apparatus for testing eyes, the combination with a carrier having an open top pocket for a trial lens, a knurled pinion in the lower portion of said pocket and means for rotating it, of a removable trial lens mounting, having its periphery knurled to correspond with the pinion and adapted to rest upon and engage the latter when placed in the pocket and means for indicating the angular position of the diametrical axis of the lens relatively to the carrier.

8. In an optical apparatus for testing eyes, the combination with a carrier for a trial lens having a radial scale at the front, and a test lens support arranged in front of the scale, of a test lens having a transparent mounting arranged upon the support and extending in front of the scale and an index on the mounting adapted to coöperate with the scale when the latter is viewed through the mounting.

9. In an optical apparatus for testing eyes, the combination of a carrier for trial lenses, a radial scale on the front face of the carrier, a plurality of supports projecting forwardly from said carrier, a cylinder trial lens having an opaque mounting adapted to be inserted in said lens carrier behind the radial scale, a prism trial lens having a transparent mounting adapted to be carried by said forwardly projecting supports in front of said radial scale, an index mark on the opaque mounting adapted to coöperate with the radial scale, and an index mark on the transparent mounting also adapted to coöperate with said radial scale.

MAX POSER.